Oct. 20, 1964    R. VOIGT    3,153,353
GEAR DRIVE ASSEMBLY
Filed Nov. 24, 1959    2 Sheets-Sheet 1
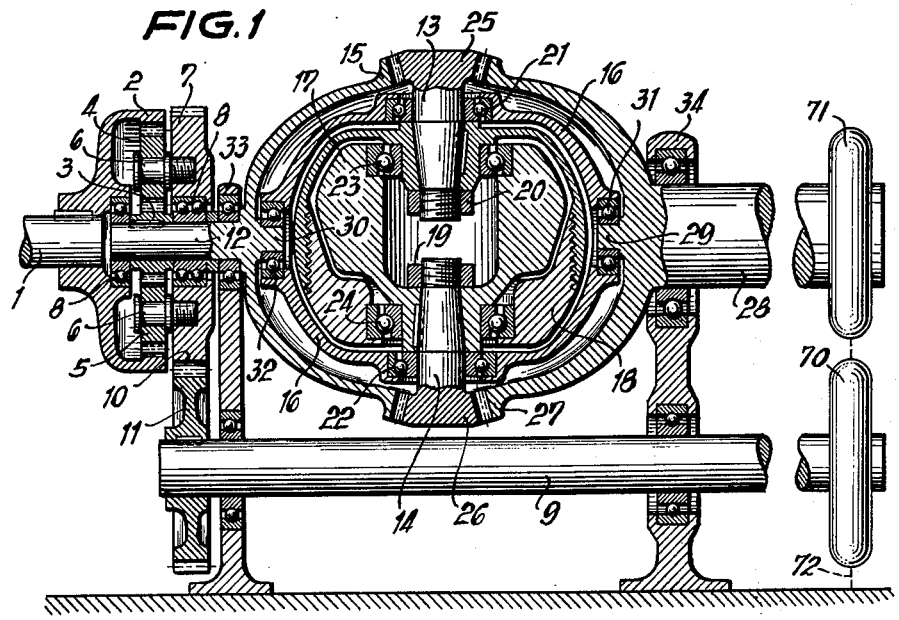
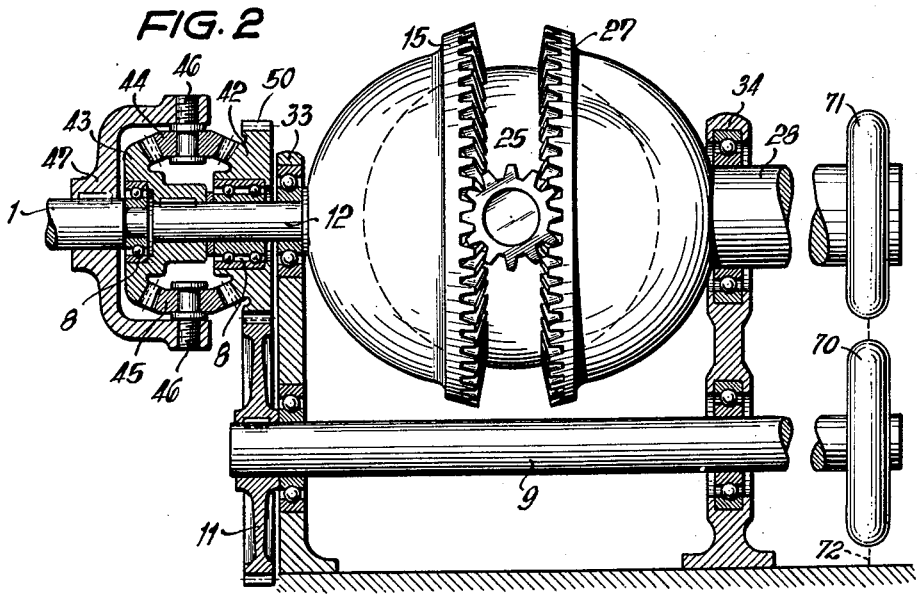
INVENTOR:
Rudolf Voigt
BY
Richards & Geier
ATTORNEYS

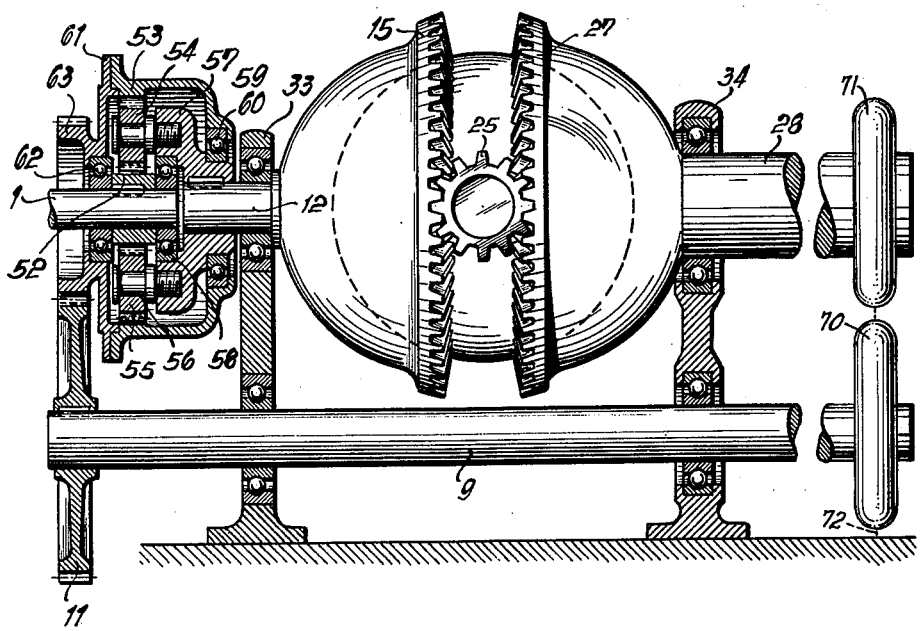

United States Patent Office 3,153,353
Patented Oct. 20, 1964

3,153,353
GEAR DRIVE ASSEMBLY
Rudolf Voigt, Buntentorsteinweg 312, Bremen, Germany
Filed Nov. 24, 1959, Ser. No. 855,170
Claims priority, application Germany Nov. 24, 1958
4 Claims. (Cl. 74—751)

The present invention relates to a gear drive assembly comprising a gyroscopic converter and adapted for motor vehicles and especially for turbine driven motor vehicles suitable for cross-country work.

It is an object of the invention to impart to the non-shiftable gear assembly such a form that the motive energy is transmitted, in a theoretically nondissipative fashion, over two separate driving shafts to the driving mechanism of the vehicle. On account of the independence of the two driving shafts, a downright ideal steering quality of the vehicle is obtained in connection with a high efficiency.

It is another object of the invention to make the main load shaft or the secondary load shaft, or both of these shafts which, on account of the road traction working upon the vehicle, are dependent upon each other, of several parts so as to make the vehicle suitable for cross-country work.

Further objects will result from the following description in connection with the drawing showing, by way of examples, various forms of embodiments of the invention. In these drawings:

FIG. 1 is the longitudinal section of a gear assembly composed of three gear parts according to a first form of embodiment of the invention;

FIG. 2 is partly a longitudinal section and partly a side view of a second form of construction of the gear assembly according to the invention;

FIG. 3 is partly a longitudinal section and partly a side view of a third form of construction of the gear assembly.

According to FIG. 1, the driving shaft 1, which is coupled with an engine as, for instance, the driving turbine of a vehicle, carries the outer wheel 2 of a planetary wheel gear forming an epicyclic drive. This outer wheel is provided with inner teeth meshing with planet wheels 4 and 5, which mesh with a central sun wheel 3 in a manner suitable for the transmission of power. The planet wheels 4 and 5 rotate about piovts 6 which are mounted in a wheel body 7. The wheel body 7 is mounted by means of ball bearings 8, upon an intermediate shaft 12 which is coaxial with the driving shaft 1. The wheel body 7 carries a toothed rim 10 which meshes with a toothed wheel 11. The latter is mounted on a main driven shaft 9 which is coupled directly to the driving mechanism, for instance to the front wheels 70 of a vehicle. The sun wheel 3 is rigidly connected to the intermediate shaft 12 supported, as is the main driven shaft 9, on the two bearing brackets 33 and 34.

The intermediate shaft 12 continues in a bevel wheel 15 positively connected, by way of the pinions 25 and 26 of a hypocyclic element gearing with it, with a bevel wheel 27 which, in its turn, is the continuation of a secondary driven shaft 28 coupled, for instance to the rear wheels 71 of the vehicle. The wheels 70 and 71 are mounted on the ground 72. The pinion 25 is provided with an axle-end pivot 13 arranged coaxially with the axle-end pivot 14 of the pinion 26 in a radial plane. The pivots 13 and 14 are rotatably mounted by means of bearings 21, 22 in a frame housing 16. The frame housing 16 is enclosed by the bell-shaped gears 15, 27 which rotate in opposite directions. A balance weight 18 is mounted, by means of a ring nut 20, on the axle-end pivot 13 and a second balance weight 17 is mounted, by means of another ring nut 19, on the other axle-end pivot 14, the second balance weight 17 being enveloped by the first balance weight 18 which, for assembly purpose, is a bipart one and, additionally, is enveloped by the bevel wheels 15 and 27. The two balance weights 17 and 18 at their opposite sides are rotatably supported against each other by ball bearings 23 and 24. The balance weights 17 and 18 rotate in opposite directions along with the pinions 25, 26 when the gears 15, 27 rotate with different speeds, whereby the weights 17 and 18 accumulate kinetic energy and form a gyroscopic element the construction of which is no part of the invention and may be designed otherwise. However, it is indispensable for the two balance weights 17 and 18 to have their moments of inertia adjusted to each other and for their size to correspond to the transmission ratio of the gear drive assembly concerned.

The frame housing 16 is rotatably supported by two ball bearings 31 and 32 mounted on the pivots 29 and 30 of the shafts 28 and 12 and, in this way, gives additional static support to the axle-end pivots 13 and 14 of the pinions 25 and 26.

The gear drive assembly consisting of the planetary gear drive 2 to 7, the differential drive 15, 25, 26, 27 and the gyro built into the differential drive and having weights 17, 18, has the following mode of operation:

When the vehicle is at a standstill, the bevel wheel 27 is blocked, since the first or main driven shaft 9 connected to the front wheels of the vehicle and the second or secondary driven shaft 28 connected to the rear wheels of the vehicle, are coupled with each other through the engagement of the wheels with the ground. When now the driving shaft 1 begins to rotate, the wheel body 7 will be held firmly, since it is operatively connected with the main driven shaft 9. Consequently, the pivots 6 carrying the planet wheels 4 and 5 will be also immovable. However, the outer wheel 2 will rotate along with the driving shaft 1 and it will rotate the planet wheels 4 and 5 about their pivots 6, with the result that the intermediate shaft 12 which carries the sun wheel 3 meshing with palnet wheels 4 and 5, will rotate in the opposite direction to that of the driving shaft 1. The bevel wheel 15 rotates along with the shaft 12, with the result that the pinions 25, 26 which mesh with the bevel wheel 15, will roll upon the immovable bevel wheel 27. The pinions 25, 26 along with their pivots 13, 14 will rotate in two planes extending perpendicularly to each other and they will cause rotation of the balance weights 17, 18 connected therewith. The frame housing 16 carrying the pivots 13, 14 will also rotate about its axis and the balance weights 17, 18 during their rotation will transform the consumed amount of driving energy into impulse energy. So long as no energy is consumed, the gyro which is constituted by the balance weights, will increase the production of impulse energy with an increase in the driving speed. The energy accumulated in the gyro acts through the pinions 25, 26 upon the bevel wheel 27 and due to the side pressure of the teeth of the pinions 25, 26, the bevel wheel 27 will begin to rotate in a direction opposite to that of the bevel wheel 15. The second driven shaft 28 will rotate with the bevel wheel 27 and due to the engagement of the vehicle wheels with the ground, the first driven shaft will also begin to turn and the vehicle will start to move. Then the second driven shaft 9 will increase its consumption of driving energy, so that less of an energy difference will be available for producing impulse energy. The speed component produced by the side pressure of the teeth of the pinions 25, 26 and reacting upon the bevel wheel 27 will decrease and power will be distributed corresponding to the operational requirements among the two driven shafts 9 and 28. The required speed of the second driven shaft 28 will be thus set correctly automatically. The power transmitted by the driving shaft 1 remains the same and is merely divided two ways.

When the inclination of the ground upon which the vehicle is travelling is changed and thus the consumption of power is also changed, there will be a different distribution of power among the two driven shafts 9 and 28 while the power requirements will remain the same.

If the power consumption of the vehicle is diminished, for example, when the vehicle drives upon a smooth horizontal surface, the power transmitted by the pinions 25, 26 upon the second driven shaft 28 will be less also. The impulse energy of the gyro forces of the balance weights 17, 18 will be diminshed to the same extent and the speed of rotation of the frame housing 16 in the bearings 31, 32 about the pivots 29, 30 will be also diminished. Therefore, the number of revolutions of the balance weights 17, 18 rotating about their gyro axes and, consequently, their gyroscopic moment will also become less and the speed of the intermediate shaft 12 will gradually become equal to the speed of the second driven shaft 28 with the exception of a small remaining slip.

When the speed of the intermediate shaft 12 diminishes while the speed of the motor remains the same, the speed of the first driven shaft 9 will increase. This takes place in the same ratio as the increase in speed of the second driven shaft 28, since the two driven shafts 9 and 28 are interrelated due to the contact of their wheels with the ground.

When the speed of the balance weights 17, 18 rotating about their gyro axis is diminished, the energy accumulated therein is freed and has an additional accelerating effect upon the entire drive.

If as the result of an increase in energy consumption of the vehicle the speed of the two driven shafts 9, 28 which are coupled through the engagement of the wheels with the ground, has diminished, the two pinions 25, 26 will roll rearwardly upon the two bevel wheels 15, 27 and their speed will increase with an increase with the diminution of speed of the two driven shafts 9, 28. In that case the first driven shaft 9 will receive a lesser amount of energy. On the other hand, the rotary balance wheels 17, 18 will receive a greater differential energy for producing impulse energy which is transmitted by the frame housing 16 to the pinions 25, 26, so that a greater amount of power is transmitted to the second driven shaft 28, without, however, any change in the output transmitted by the motor to the driving shaft 1.

The described changes in forces are repeated if the resistance is again diminished, with the result that the output supplied by the motor is always distributed automatically by the gyro serving as a converter between the two driven shafts 9, 28 depending upon prevailing operational conditions, without it being necessary to regulate the driving motor.

In case the vehicle is started on an upward slope and the brake is released too soon so that the vehicle begins to roll backwards, the difference in speed between the two rearwardly rotating driven shafts 9, 28 and the driving shaft 1, when the normal speed of the motor is reached, will be superelevated in such a way when the latter will have reached its normal speed that, for instance, the overstrained shaft 28 will threaten to break. If, however, the road traction acting upon the wheels of the vehicle will be insufficient the rear wheels will slip on the road and the vehicle will come to a stop and will then start in the right direction.

The form of construction shown in FIG. 2 corresponds essentially to that shown in FIG. 1, the sole difference consisting in the fact that the planet wheel gear is of a different design. A bell-shaped gear part 47 connected to the driving shaft 1 carries the radial axle-end pivots 46 of the planet pinions 44 and 45 engaging a sun wheel 43 mounted on the intermediate shaft 12 on the one and a sun wheel 42 on the other hand, the latter carrying a gear wheel 50 and being journalled upon the intermediate shaft 12 by means of the ball bearings 8. The said gear wheel engages, in the same manner as the gear wheel 10 of the first form of construction, the gear wheel 11 mounted on the main driven shaft 9.

FIG. 3 shows a gear drive assembly the planet wheel gear of which is somewhat different in design from the two preceding forms of construction.

On the driving shaft 1 is mounted a sun wheel 52 engaging, with its toothing, the two planet pinions 54 and 55. These are supported by pivots 56 carried by a wheel body 57 mounted on the end of the intermediate shaft 12 and additionally supported, by means of a ball bearing 58, by the driving shaft 1. The two planet pinions 54 and 55 further engage an interior toothing 53 the bell-shaped wheel body 59 of which is supported, by means of a ball bearing 60, by the hub of the wheel body 57 on the one and, by means of a disk 61 and a ball bearing 62, by the driving shaft 1 on the other hand. The disk is part of a gear wheel 63 engaging the gear wheel 11 mounted upon the main load shaft 9. This construction due to the high reduction gear ratio of the planetary gear drive is particularly suitable for a drive by a high speed turbine.

The forms of construction shown in FIGURES 2 and 3 have the same mode of operation as the one explained in detail in connection with FIG. 1.

I claim:

1. In a gear drive assembly for vehicles, having a driving shaft, an intermediate shaft, a main front driven shaft, a second rear driven shaft, and means interconnecting said driven shafts for rotation at the same relative speed; in combination with a gyroscopic converter comprising a bevel wheel connected to said intermediate shaft, another bevel wheel connected to said second driven shaft, two pivots coaxial with said bevel wheels and connected with said intermediate shaft and said second shaft, respectively, a frame housing coaxially rotatably carried by said pivots, two pinions meshing with said bevel wheels and adapted to exert variable side pressure thereon, two symmetrical axle-end pivots supported by said frame housing and carrying said pinions, and two separate balance weights carried by said axle-end pivots, said pinions kinetically gyroscopically connecting in a common gravity center said intermediate shaft and the secondary driven shaft, whereby said balance weights are angularly rotatable along with said shafts and whereby said pinions rotate or swing relatively to said bevel wheels, when speed differences arise; and a planetary gear drive comprising two gear wheels, a plurality of rotary planetary pinions meshing with said gear wheels, and a rotary supporting member carrying said pinions; a drive comprising means providing a driving connection between one of said two gear wheels and one of said three shafts, means providing a driving connection between the other one of said two gear wheels and another one of said three shafts and means providing a driving connection between said rotary supporting member and a third one of said three shafts.

2. In a gear drive assembly for vehicles, having a driving shaft, an intermediate shaft, a main front driven shaft, a second rear driven shaft, and means interconnecting said driven shafts for rotation at the same relative speed; in combination with a gyroscopic converter comprising a bevel wheel connected to said intermediate shaft, another bevel wheel connected to said second driven shaft, two pivots coaxial with said bevel wheels and connected with said intermediate shaft and said second shaft, respectively, a frame housing coaxially rotatably carried by said pivots, two pinions meshing with said bevel wheels and adapted to exert variable side pressure thereon, two symmetrical axle-end pivots supported by said frame housing and carrying said pinions, and two separate balance weights carried by said axle-end pivots, said pinions kinematically gyroscopically connecting in a common gravity center said intermediate shaft and the secondary driven shaft, whereby said balance weights are angularly rotatable along with said shafts and whereby said pinions rotate or swing relatively to said bevel wheels, when speed differences arise; and a planetary gear drive comprising two gear wheels, a plurality of rotary planetary pinions meshing with said gear wheels, and a rotary supporting member carrying said pinions; a drive comprising means providing a driving connection between said rotary supporting member and the main driven shaft, means providing a driving connection between one of the two gear wheels and the driving shaft and means providing a driving connection between the other gear wheel and the intermediate shaft.

3. In a gear drive assembly for vehicles, having a driving shaft, an intermediate shaft, a main front driven shaft, a second rear driven shaft, and means interconnecting said driven shafts for rotation at the same relative speed; in combination with a gyroscopic converter comprising a bevel wheel connected to said intermediate shaft, another bevel wheel connected to said second driven shaft, two pivots coaxial with said bevel wheels and connected with said intermediate shaft and said second shaft, respectively, a frame housing coaxially rotatably carried by said pivots, two pinions meshing with said bevel wheels, and adapted to exert variable side pressure thereon two symmetrical axle-end pivots supported by said frame housing and carrying said pinions, and two separate balance weights carried by said axle-end pivots, said pinions kinematically gyroscopically connecting in a common gravity center said intermediate shaft and the second driven shaft, whereby said balance weights are angularly rotatable along with said shafts and whereby said pinions rotate or swing relatively to said bevel wheels, when speed differences arise; and a planetary gear drive comprising two gear wheels, a plurality of rotary planetary pinions meshing with said gear wheels, and a rotary supporting member carrying said pinions; a drive comprising means providing a driving connection between said rotary supporting member and the driving shaft, means providing a driving connection between one of said two gear wheels and said intermediate shaft and means providing a driving connection between the other gear wheel and said main driven shaft.

4. In a gear drive assembly for vehicles, having a driving shaft, an intermediate shaft, a main front driven shaft, a second rear driven shaft, and means interconnecting said driven shafts for rotation at the same relative speed; in combination with a gyroscopic converter comprising a bevel wheel connected to said intermediate shaft, another bevel wheel connected to said second driven shaft, two pivots coaxial with said bevel wheels and connected with said intermediate shaft and said second shaft, respectively, a frame housing coaxially rotatably carried by said pivots, two pinions meshing with said bevel wheels and adapted to exert variable side pressure thereon, two symmetrical axle-end pivots supported by said frame housing and carrying said pinions, and two separate balance weights carried by said axle-end pivots, said pinions kinematically gyroscopically connecting in a common gravity center said intermediate shaft and the secondary driven shaft, whereby said balance weights are angularly rotatable along with said shafts and whereby said pinions rotate or swing relatively to said bevel wheels, when speed differences arise; and a planetary gear drive comprising two gear wheels, a plurality of rotary planetary pinions meshing with said gear wheels, and a rotary supporting member carrying said pinions; a drive comprising means providing a driving connection between said rotary supporting member and the intermediate shaft, means providing a driving connection between one of the two gear wheels and the driving shaft and means providing a driving connection between the other gear wheel and the main driven shaft, respectively.

References Cited in the file of this patent

UNITED STATES PATENTS

| 1,758,252 | Gardner | May 13, 1930 |
| 1,887,705 | Worrall | Nov. 15, 1932 |
| 2,045,584 | Cotanch | June 30, 1936 |
| 2,067,562 | Cotanch | Jan. 12, 1937 |

FOREIGN PATENTS

| 150,353 | Great Britain | Aug. 26, 1920 |
| 701,501 | France | Jan. 12, 1931 |
| 772,107 | France | Oct. 23, 1934 |
| 849,532 | France | Aug. 21, 1939 |
| 918,598 | France | Feb. 12, 1947 |
| 1,012,221 | France | July 7, 1952 |

OTHER REFERENCES

"Power-Dividing Transmissions," Bedingfield, Machine Design July 25, 1957, page 83 (p. 83 only).